US012662869B2

(12) United States Patent
Snyder

(10) Patent No.: US 12,662,869 B2
(45) Date of Patent: Jun. 23, 2026

(54) MULL SYSTEM FOR WINDOWS AND DOORS

(71) Applicant: MI Windows and Doors, LLC, Gratz, PA (US)

(72) Inventor: Brandon R. Snyder, Lykens, PA (US)

(73) Assignee: MI Windows and Doors, LLC, Gratz, PA (US)

( * ) Notice: Subject to any disclaimer, the term of this patent is extended or adjusted under 35 U.S.C. 154(b) by 0 days.

(21) Appl. No.: 17/984,174

(22) Filed: Nov. 9, 2022

(65) Prior Publication Data

US 2024/0151095 A1 May 9, 2024

(51) Int. Cl.

*E06B 1/60* (2006.01)
*E06B 1/36* (2006.01)
*E06B 1/52* (2006.01)
*E06B 7/16* (2006.01)

(52) U.S. Cl.

CPC .............. *E06B 1/524* (2013.01); *E06B 1/366* (2013.01); *E06B 7/16* (2013.01); *E06B 1/6007* (2013.01)

(58) Field of Classification Search

CPC . E06B 1/38; E06B 1/366; E06B 1/524; E06B 1/6007; E06B 7/16; E06B 3/365; E06B 1/68

See application file for complete search history.

(56) References Cited

U.S. PATENT DOCUMENTS

| | | | | | |
|---|---|---|---|---|---|
| 4,207,717 | A * | 6/1980 | Hubbard | E04B 2/96 52/771 |
| 4,750,310 | A * | 6/1988 | Holcombe | E06B 1/38 403/348 |
| 4,796,395 | A * | 1/1989 | Israel | E04B 1/0046 52/204.593 |
| 5,469,683 | A * | 11/1995 | McKenna | E06B 3/273 52/844 |
| 5,560,155 | A * | 10/1996 | Back | E06B 3/223 52/762 |
| 5,771,640 | A * | 6/1998 | Back | E06B 3/223 52/762 |
| 6,185,882 | B1 * | 2/2001 | Pearson | F41H 5/26 52/204.5 |
| 6,405,504 | B1 * | 6/2002 | Richardson | E06B 1/6007 52/843 |
| D565,199 | S * | 3/2008 | Westphal | D25/122 |
| 9,091,116 | B2 | 7/2015 | Saunders et al. | |
| 9,316,040 | B2 | 4/2016 | Saunders et al. | |
| 9,932,765 | B1 * | 4/2018 | Kelley | E06B 3/964 |
| 10,017,980 | B2 | 7/2018 | Saunders et al. | |
| 10,526,834 | B2 | 1/2020 | Luvison | |
| 10,626,664 | B1 * | 4/2020 | Kelley | E06B 1/6015 |

(Continued)

FOREIGN PATENT DOCUMENTS

| | | | |
|---|---|---|---|
| CN | 109441286 | A | 3/2019 |
| JP | 2020016074 | A | 1/2020 |

*Primary Examiner* — Kyle J. Walraed-Sullivan

(74) *Attorney, Agent, or Firm* — Harter Secrest & Emery LLP; Timothy W. Menasco, Esq.

(57) ABSTRACT

A system for mulling a plurality a first fenestration frame and a second fenestration frame including a primary mull connector that is sliding received between the first and second fenestration frames. The primary mull connector having a first end with a jamb engagement portion and a second end that is free of a jamb engagement portion.

18 Claims, 11 Drawing Sheets

(56) References Cited

U.S. PATENT DOCUMENTS

| | | | | |
|---|---|---|---|---|
| 2002/0092248 | A1* | 7/2002 | Westphal | E06B 1/6007 52/204.5 |
| 2003/0217523 | A1* | 11/2003 | Budzinski | E06B 1/6007 52/204.5 |
| 2007/0079557 | A1* | 4/2007 | Pepper | E06B 3/365 49/367 |
| 2008/0010919 | A1* | 1/2008 | Tufts | E06B 1/366 52/204.591 |
| 2008/0216424 | A1* | 9/2008 | Westphal | E06B 1/6007 52/204.5 |
| 2008/0302036 | A1* | 12/2008 | McMahon | E06B 1/6007 52/745.09 |
| 2013/0212973 | A1* | 8/2013 | Saunders | E06B 1/366 52/656.5 |
| 2013/0291459 | A1* | 11/2013 | Frey | E06B 3/5409 52/656.5 |
| 2015/0020465 | A1* | 1/2015 | Saunders | E06B 3/663 52/204.6 |
| 2015/0233169 | A1* | 8/2015 | Saunders | E06B 1/6007 52/204.7 |
| 2019/0093416 | A1* | 3/2019 | Luvison | E06B 1/524 |
| 2020/0032510 | A1* | 1/2020 | Claeys | E06B 1/366 |
| 2021/0222480 | A1* | 7/2021 | Ohrstrom | E06B 3/06 |
| 2022/0034148 | A1* | 2/2022 | Gorman | E06B 1/56 |
| 2023/0383588 | A1* | 11/2023 | Lund | E06B 1/6007 |

* cited by examiner

MULL SYSTEM FOR WINDOWS AND DOORS

CROSS-REFERENCE TO RELATED PATENT APPLICATIONS

None.

BACKGROUND OF THE INVENTION

The present invention relates generally to fenestration assemblies and in particular to a system and method for mulling of windows and doors.

Window and door units are sometimes grouped together and installed into one opening in the building that must first be connected together and sealed. This connection of units is called mulling. Units can be mulled in the factory (factory mulled) or on the jobsite prior to installation (field mulled). Factory mulled windows are typically preferred. Field mulling is used when factory mulling cannot be performed due to size, weight or shipping limits. Field mulling adds labor and complexity because the installer must assemble and seal the unit prior to installation. Once mulled on the jobsite the oversized units must be lifted into the opening which risks injury to the installers as well as damage to the mulled unit.

It would be desirable to provide a system and method for both factory mulling and field mulling two or more fenestration assemblies (e.g., windows and/or doors) that allows each fenestration assembly to be installed in an opening of a building one at a time or together.

SUMMARY OF THE INVENTION

In one embodiment, a system for mulling a first fenestration frame and a second fenestration frame together, the system comprises a first fenestration frame having a first jamb and a second jamb, a second fenestration frame having a having a first jamb and a second jamb, and a primary mull connector slidingly received between the first fenestration frame and the second fenestration frame in a direction from a first side of the first fenestration frame and the second fenestration frame toward a second side of the first fenestration frame and the second, fenestration frame, the primary mull connector having a jamb engagement portion fitting into a first portion of the second jamb of the first fenestration frame on the first side of the first fenestration frame and a first portion of the first jamb of the second fenestration frame on the first side of the second fenestration frame, wherein the primary mull connector has a first end with the jamb engagement portion and a second end with no jamb engagement portion.

In one example, the second jamb of the first fenestration frame faces the first jamb of the second fenestration frame, the primary mull connector including a first groove and a second groove intermediate the first end of the primary mull connector and the second end of the primary mull connector, a first weather stripping having a first side within the first groove and a second weather stripping having a first side with the second groove.

In one implementation, the system further includes a first end cover configured to fit onto the first end of the primary mull connector.

In one implementation, the system further includes a secondary mull connector secured to the second end of the primary mull connector and being fit into the second jamb of the first fenestration frame on the second side of the first fenestration frame and the first jamb of the second fenestration frame on the second side of the second fenestration frame.

In one implementation, the system further includes a second end cover configured to fit onto the secondary mull connector.

In one implementation, the secondary mull connector includes a planar portion positioned adjacent to a planar portion of the second end of the primary mull connector and raised portions extending away from the second end of the primary mull connector.

In one implementation, a first weather stripping coupled to the primary mull connector includes a sealing portion contacting the second jamb of the first fenestration frame and a second weather stripping coupled to the primary mull connector includes a sealing portion contacting the first jamb of the second fenestration frame.

In one implementation, the second jamb of the first fenestration frame includes a raised portion intermediate the first side of the first fenestration frame and the second side of the first fenestration frame. The first jamb of the second fenestration frame includes a raised portion intermediate the first side of the second fenestration frame and the second side of the second fenestration frame. The sealing portion of the first weather stripping contacts the raised portion of the second jamb of the first fenestration frame and the sealing portion of the second weather stripping contacts the raised portion of the first jamb of the second fenestration frame.

In one implementation, the second end of the primary mull connector is planar.

In one implementation, the second end of the primary mull connector has a planar surface with protrusions adjacent to the second jamb of the first fenestration frame and to the first jamb of the second fenestration frame.

In one implementation, the second jamb of the first fenestration frame and the first jamb of the second fenestration frame includes substantially planer surfaces facing each other.

In one implementation, the system further includes a sealant sealing an exterior portion of the primary mull connector with second jamb of the first fenestration frame and with the first jamb of the second fenestration frame.

In one embodiment, a method for mulling a plurality of fenestration frames includes providing a first fenestration frame having a first fenestration frame jamb, providing a second fenestration frame having a second fenestration frame jamb facing the first fenestration frame jamb, and sliding a primary mull connector between the first fenestration frame jamb and the second fenestration frame jamb in a direction from a first side of the first fenestration frame and the second fenestration frame toward a second side of the first fenestration frame and the second fenestration frame. The primary mull connector has a jamb engagement portion fitting into a first portion of the second jamb of the first fenestration frame on the first side of the first fenestration frame and a first portion of the first jamb of the second fenestration frame on the first side of the second fenestration frame. The primary mull connector has a first end with the jamb engagement portion and a second end with no jamb engagement portion.

In one implementation, the method further comprises fitting a first end cover onto the first end of the primary mull connector.

In one implementation, the method further comprises securing a secondary mull connector to the second end of the primary mull connector and being fit into the second jamb of the first fenestration frame on the second side of the first fenestration frame and the first jamb of the second fenestration frame on the second side of the second fenestration frame.

In one implementation, the secondary mull connector is secured to the primary mull connector with a fastener extending through the secondary mull connector and the second end of the primary mull connector.

In one implementation, the secondary mull connector is snap fitted to the second jamb of the first fenestration frame and the first jamb of the second fenestration frame.

In one implementation, the method further comprises fitting a second end cover the secondary mull connector.

In one implementation, the method further comprises providing a first weather stripping coupled to the primary mull connector and including a sealing portion, and providing a second weather stripping coupled to the primary mull connector and including a sealing portion. When the primary mull connector is slid between the first fenestration frame jamb and the second fenestration frame jamb, the sealing portion of the first weather stripping contacts the second jamb of the first fenestration frame and the sealing portion of the second weather stripping contacts the first jamb of the second fenestration frame.

In one embodiment, the method further comprises applying a sealant sealing an exterior portion of the primary mull connector with second jamb of the first fenestration frame and with the first jamb of the second fenestration frame.

DETAILED DESCRIPTION OF THE PREFERRED EMBODIMENTS

The following description discusses a system and method for field mulling two or more fenestration assemblies (e.g., windows and/or doors). While the following description refers to windows, it should be understood that the systems and methods described herein may also be used with other types of fenestration assemblies (e.g., doors). For the purposes of this application, the term "exterior" will refer to the direction toward the outside of an enclosure or building while the term) "interior" will refer to the direction toward the inside of the enclosure or building.

Figure 1:
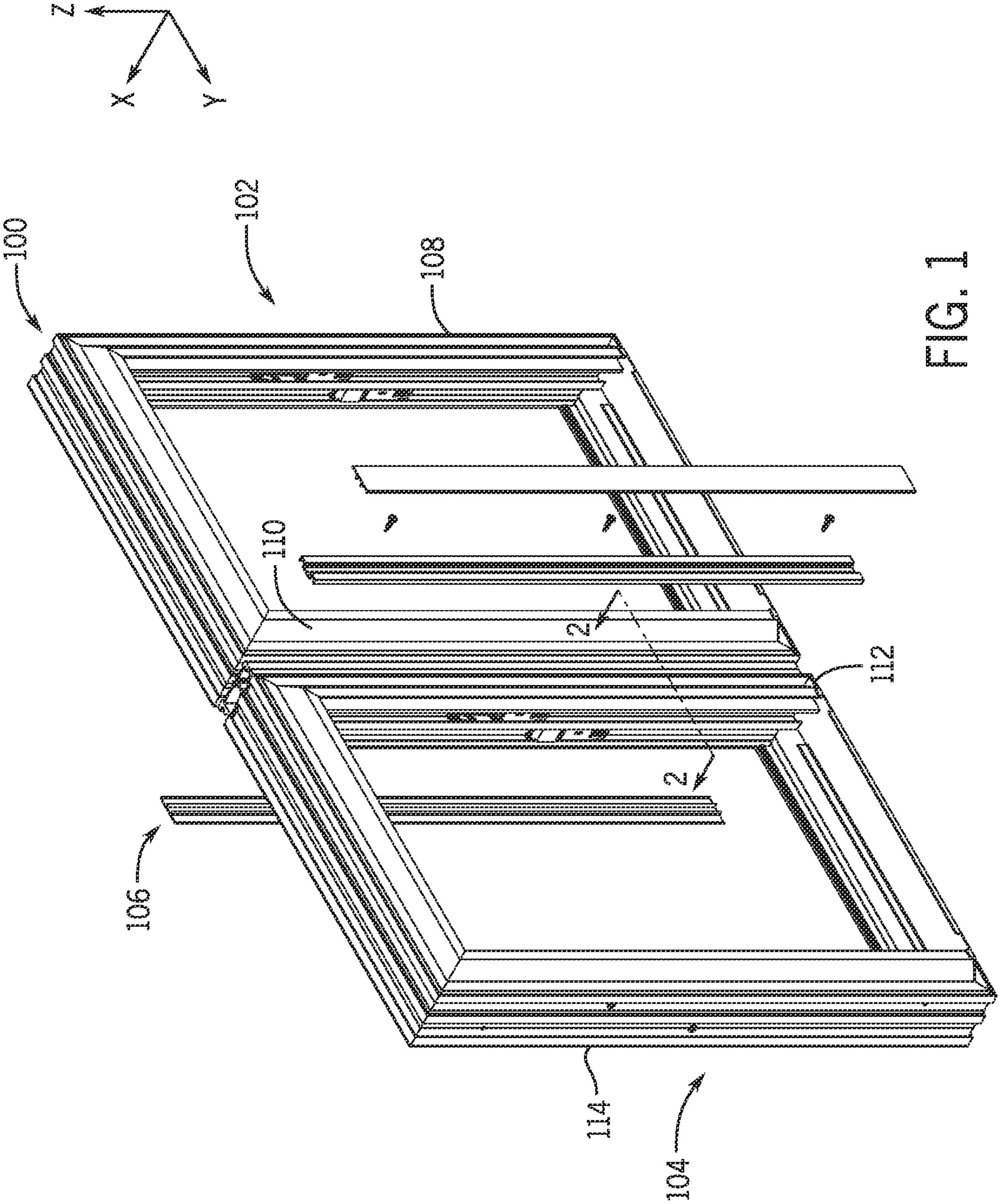
FIG. 1 is a perspective view of a fenestration assembly with a mullion assembly partially installed.

Referring to FIG. 1 a mulled fenestration assembly 100 includes a first fenestration frame 102 and a second fenestration frame 104 being secured together with a mull assembly 106. First fenestration frame 102 includes a first jamb 108 and a second jamb 110 spaced from and parallel to first jamb 108 of first fenestration frame 102. Second fenestration frame 104 includes a first jamb 112 and a second fenestration second jamb 114 spaced from and parallel to first jamb 112, Second jamb 110 of first fenestration frame 102 is closely adjacent to first jamb 112 of second fenestration frame 104 when first fenestration frame 102 and second fenestration frame 104 are secured to one another with mull assembly 106. As will be discussed herein below mull assembly 106 includes a primary mull connector 210, a secondary mull connector, a first cover, and a second cover.

Figure 2:
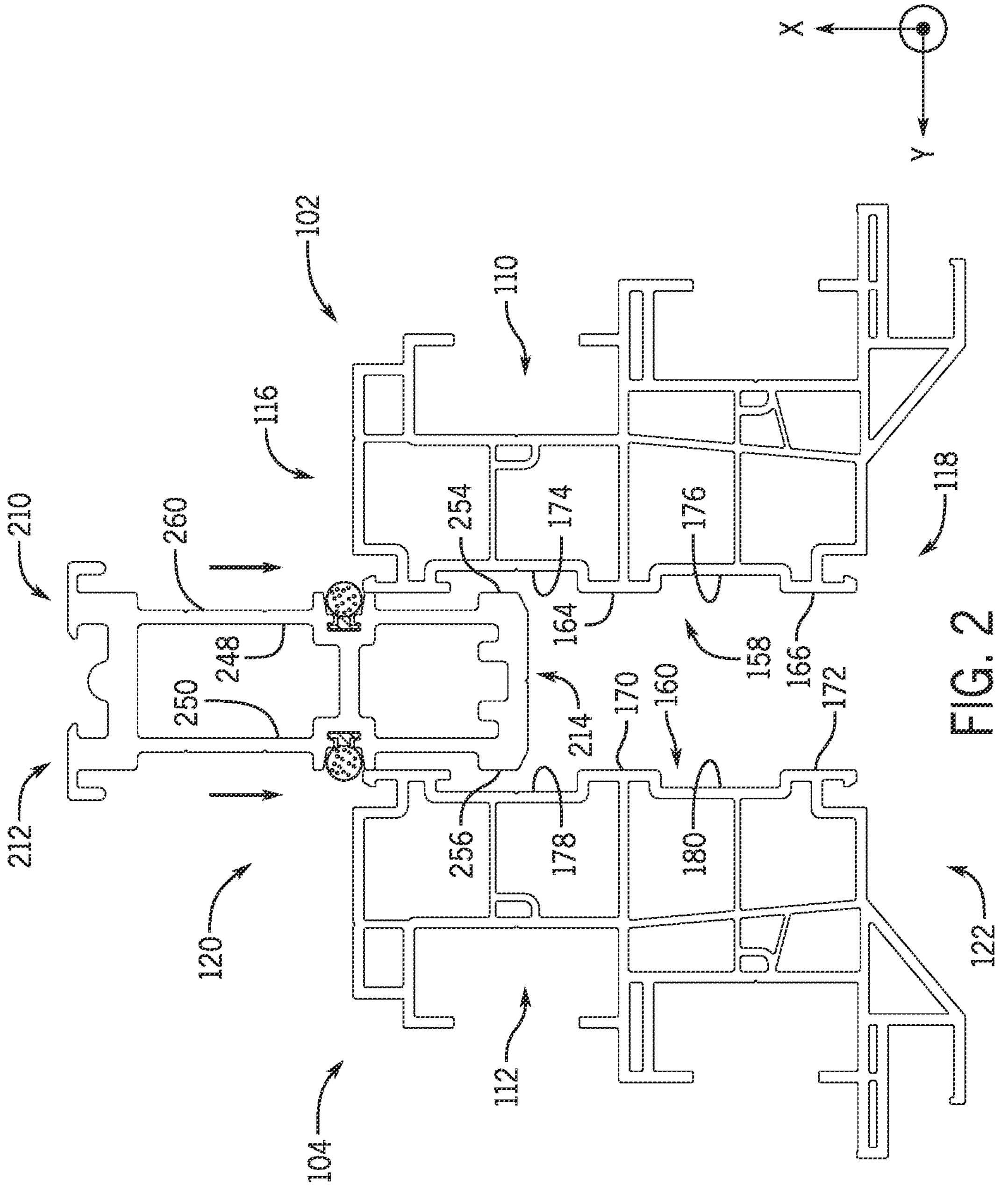
FIG. 2 is a cross sectional view of the fenestration assembly of FIG. 1.
Figure 2A:
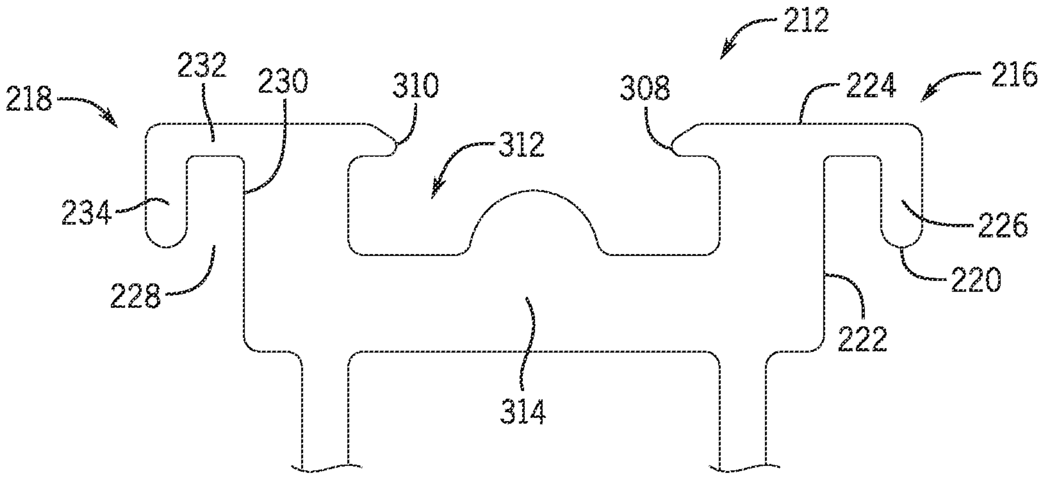
FIG. 2A is a close up of a first side of the primary mull connector.
Figure 2B:
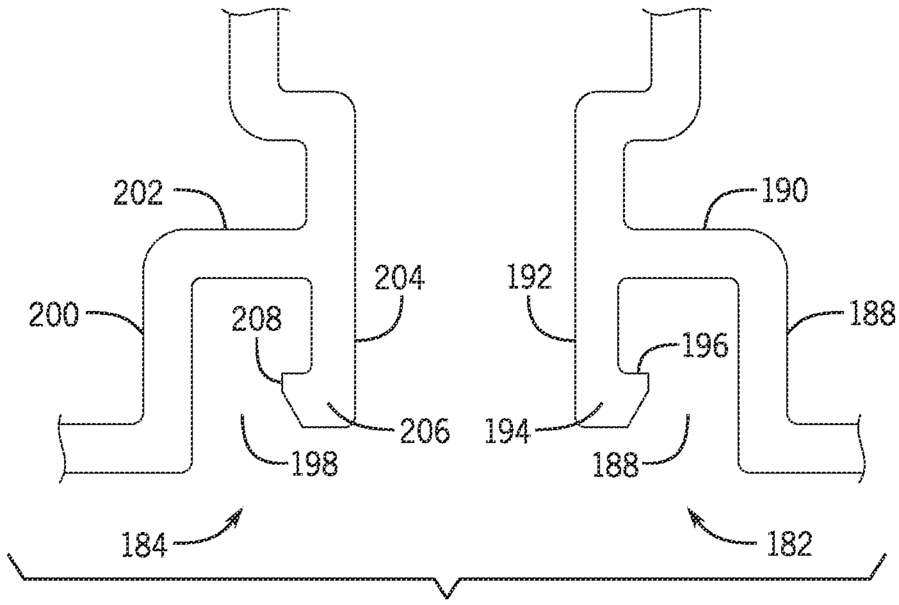
FIG. 2B is a close up of a second side of the second jamb of a first fenestration frame and a second side of the first jamb of a second fenestration frame.

Referring to FIG. 2 first fenestration frame 102 includes a first side 116 and a second side 118 opposite first side 116. Second fenestration frame 104 includes a first side 120 and a second side 122 opposite first side 120. In one example the first side 116 of the first fenestration frame 102 is the interior side of the first fenestration frame 102, and the second side 118 of the first fenestration frame 102 is the exterior side of the first fenestration frame 102. Similarly, the first side 120 of the of the second fenestration frame 104 is the interior side of the second fenestration frame 104, and the second side 122 of the second fenestration frame 104 is the exterior side of the second fenestration frame 104. In other examples, the sides may be reversed, with the first side being the exterior side and the second side being the interior side of the first fenestration frame 102 and second fenestration frame 104.

Figure 3:
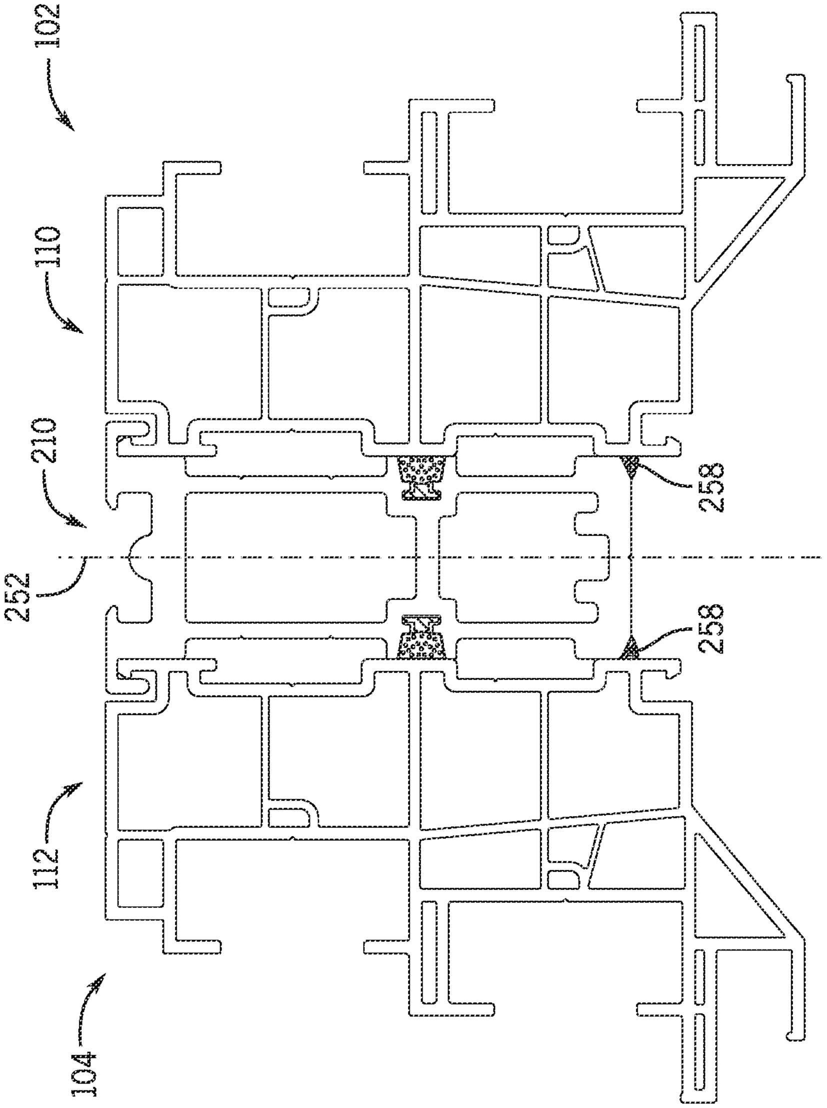
FIG. 3 is the cross sectional view of FIG. 2, with the mull body in the engaged position.

FIG. 2 is a cross sectional view of a portion of the fenestration assembly of FIG. 1 taken generally along line 2-2 in a first install position. FIG. 3 also illustrates a coordinate system used to facilitate the description herein. In the coordinate system, the X-axis represents the direction perpendicular to the plane of the fenestrations. Thus, for a fenestration assembly on a wall of a building, the positive X-axis is directed from the exterior of the building toward the interior of the building. The positive Y-axis is directed in the plane of the fenestrations in a direction from one fenestration frame to the next.

Figure 2C:
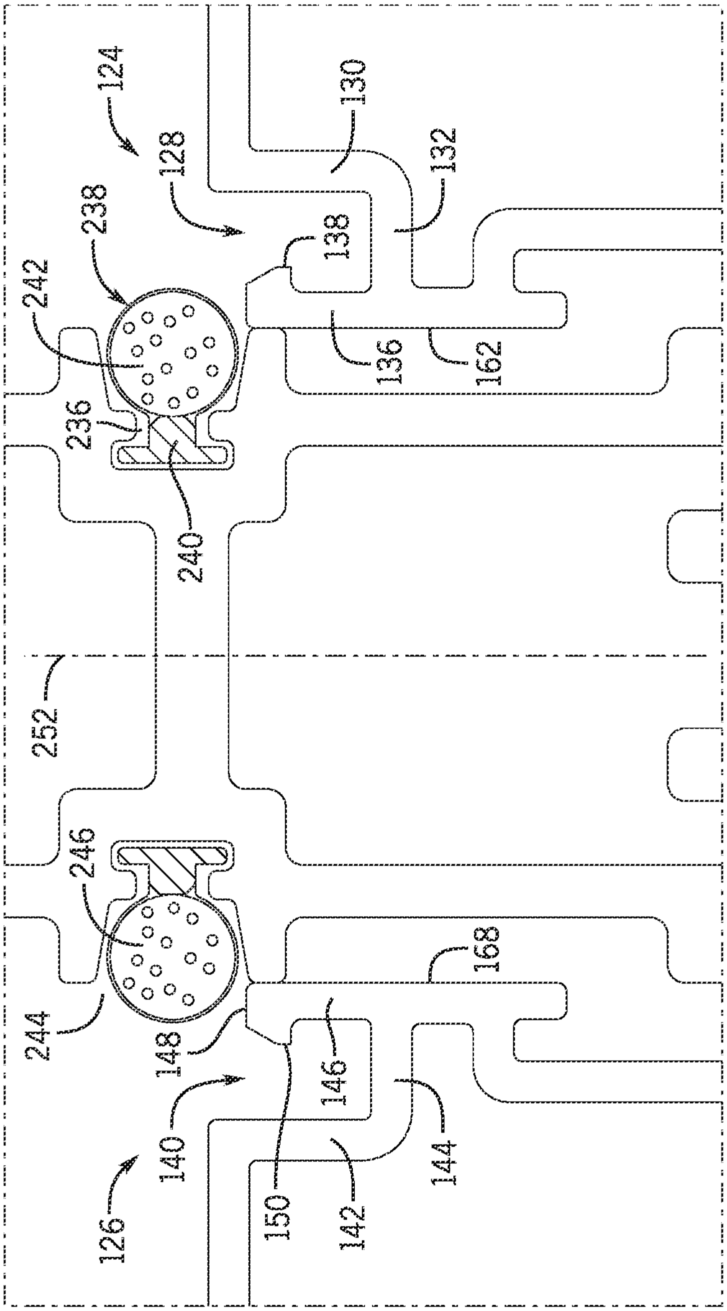
FIG. 2C is a close up of the primary mull connector and weather stripping and first side jamb engagement portion of FIG. 2C.
Figure 2D:
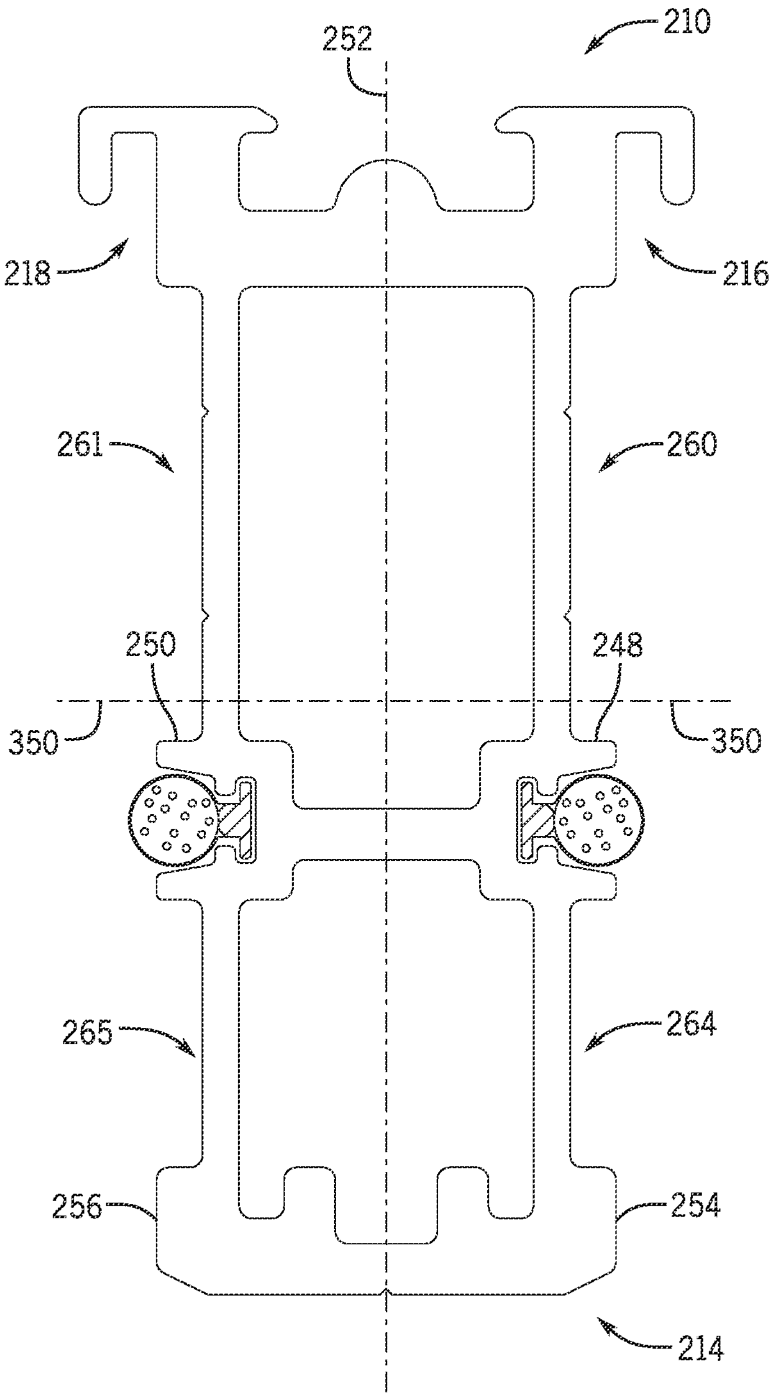
FIG. 2D is a cross sectional view of the primary mull connector.

Referring to FIG. 2 and FIG. 2C, second jamb 110 of first fenestration frame 102 includes a first side first receiving portion 124 and first jamb 112 of second fenestration frame 104 includes a first side second receiving portion 126. First side first receiving portion 124 includes a groove 128 defined by a first wall portion 130 a base portion 132 and a second wall portion 134 having a free end defining a barb 136. Barb 136 has a projection 138 extending in a direction toward the inside of groove 128 and away from first jamb 112 of second fenestration frame 104.

Similarly, first side second receiving portion 126 includes a groove 140 defined by a first wall portion 142, a base portion 144 and a second wall portion 146 having a free end defining a barb 148. Barb 148 has a projection 150 extending in a direction toward the inside of groove 140 and away from second jamb 110 of first fenestration fraud 02.

In one implementation a wall 158 of second jamb 110 of first fenestration frame 102 and a wall 160 of first jamb 112 of second fenestration frame 104 face each other and are generally planar to allow a primary mull connector of the mull assembly 106 to slide therebetween. In one implementation second jamb 110 and first jamb 112 are provided with features to facilitate certain functions, such as sealant functions. Referring to FIG. 2 second jamb 110 of the first fenestration frame 102 is provided with a first raised portion 162 proximate the first side 116 a second raised portion 164 intermediate the first side 116 and the second side 118 and a third raised portion 166 proximate the second side 118. Similarly, first jamb 112 of the second fenestration frame 104 is provide with a first raised portion 168 proximate the first side 116, a second raised portion 170 intermediate the first side 116 and the second side 118 and a third raised portion 172 proximate the second side 118. Stated another way second jamb 110 of first fenestration frame 102 includes a first recess 174 between first raised portion 162 and second, raised portion 164 and a second recess 176 between second raised portion 164 and third raised portion 166. Similarly, first jamb 112 of second fenestration frame 104 includes a first recess 178 between first raised portion 168 and second raised portion 170 and a second recess 180 between second raised portion 170 and third raised portion 172.

Second jamb 110 of first fenestration frame 102 includes a second side first receiving portion 182 proximate second side 118 and first jamb 112 of second fenestration frame 104 includes a second side second receiving portion 184 proximate second side 118.

Second side first receiving portion 182 includes a groove 186 defined by a first wall portion 188 a base portion 190 and a second wall portion 192 having a free end defining a barb 194. Barb 194 has a projection 196 extending in a direction toward the inside of groove 186 and away from first jamb 112 of second fenestration frame 104.

Similarly, second side second receiving portion 184 includes a groove 198 defined by a first wall portion 200, a base portion 202 and a second wall portion 204 having a free end defining a barb 206. Barb 206 has a projection 208 extending in a direction toward the inside of groove 198 and away from second jamb 110 of first fenestration frame 102.

Referring to FIG. 2, mull assembly 106 includes a primary mull connector 210 including a first end portion 212 and a second end portion 214 that is opposite the first end portion along the X Axis. First end portion 212 includes a first jamb engagement portion 216 and a second jamb engagement portion 218. Primary mull connector 210 is slid between first fenestration frame 102 and second fenestration frame 104 from the first side 116 toward the second side 118, until the first jamb engagement portion 216 and the second jamb engagement portion 218 engages the first side first receiving portion 124 of second jamb 110 and the first side second receiving portion 126 respectively. Stated another way primary mull connector 210 is slid between facing walls 158, 160 of second jamb 110 of first fenestration frame 102 and first jamb 112 of second fenestration frame 104 respectively.

In one implementation first jamb engagement portion 216 and second jamb engagement portion 218 extend along the entire length (along the Z-axis) of primary mull connector 210. Similarly, in one implementation first side first receiving portion 124 and first side second receiving portion 126 extend along the entire length (along the Z-axis) of second jamb 110 of first fenestration frame 102 and first jamb 112 of second fenestration frame 104 respectively.

First jamb engagement portion 216 includes a groove 220 defined by a first wall 222, a base wall 224 and a second wall 226 spaced from and generally parallel to first wall 222. Similarly, second jamb engagement portion 218 includes a groove 228 defined by a first wall 230, a base wall 232 and a second wall 234 spaced from and generally parallel to first wall 230.

Referring to FIG. 2C primary mull connector 210 is provided with a first groove 236 in the surface of primary mull connector 210 facing second iamb 110 of the first fenestration frame 102. The first groove 236 extends along the entire length (along the Z-axis) of the primary mull connector 210. The first groove 236 is configured to receive therein a first weather stripping member 238. The weather stripping member 238 includes a first side 240 which securely fits into the first groove 236. The weather stripping member 238 further includes a sealing portion 242. The sealing portion 242 is formed of a generally compressible material which can form a seal between primary mull connector 210 and a landing of second raised portion 164 of second jamb 110 of the first fenestration frame 102.

Primary mull connector 210 is provided with a second groove 244 on the surface facing the fenestration frame jamb 112 of the second fenestration frame 104. Second groove 244 extends along the entire length (along the Z-axis) of primary mull connector 210. The second groove 244 is configured to receive therein a second weather stripping 246 which serves to form a seal between primary mull connector 210 and a landing of second raised portion 170 of first jamb 112 of the second fenestration frame 104.

In one implementation first groove 236 is formed in a first landing 248 and second groove 244 is formed in a second landing 250. First landing 248 and second landing 250 have a distance from a center line 252 (taken along the Y axis) of primary mull connector 210 that is less than the distance between center line 252 and the surface of second jamb 110 and first jamb 112. Weather stripping extends from landing 248 and 250 respectively to fill the gap between the landing 248 and 250 and the surfaces of second raised portion 164 and second raised portion 170 respectively.

Second end portion 214 of primary mull connector 210 is not provided with any jamb engagement portion. Stated another way second end portion 214 of primary mull connector 210 is free of a jamb engagement portion that directly attaches to a portion of either second jamb 110 or first jamb 112. The lack of a jamb engagement portion on second end portion 214 allows second end portion 214 of the primary mull connector 210 to slide in the space between the between the fenestration frame jambs 110, 112 during the insertion of primary mull connector 210 between first fenestration frame 102 and second fenestration frame 104.

Referring to FIG. 2 and FIG. 3, in one implementation second end portion 214 of primary mull connector 210 includes a first surface 254 having distance from center line 252 in the Y axis direction that is substantially the same as the distance of surface of third raised portion 166 of jamb 110 to center line 252 when primary mull connector 210 is in a fully installed orientation. Similarly, second end portion 214 of primary mull connector 210 includes a second surface 256 having distance from center line 252 that is substantially the same as the distance of surface of third raised portion 172 of jamb 110 to center line 252 when primary mull connector 210 is in a fully installed orientation. Any gap that remains between first surface 254 and third raised portion 166 in a direction perpendicular to the center line 252 is sealed with a sealant 258.

In one implementation primary mull connector 210 includes a first recess 260 between first end portion 212 and landing 248 and a similar recess 261 between first end portion 212 and landing 250. Primary mull connector 210 in one implementation includes a second recess 264 between landing 248 and second end portion 214 and a similar recess 265 between landing 250 and second end portion 214.

Figure 4:
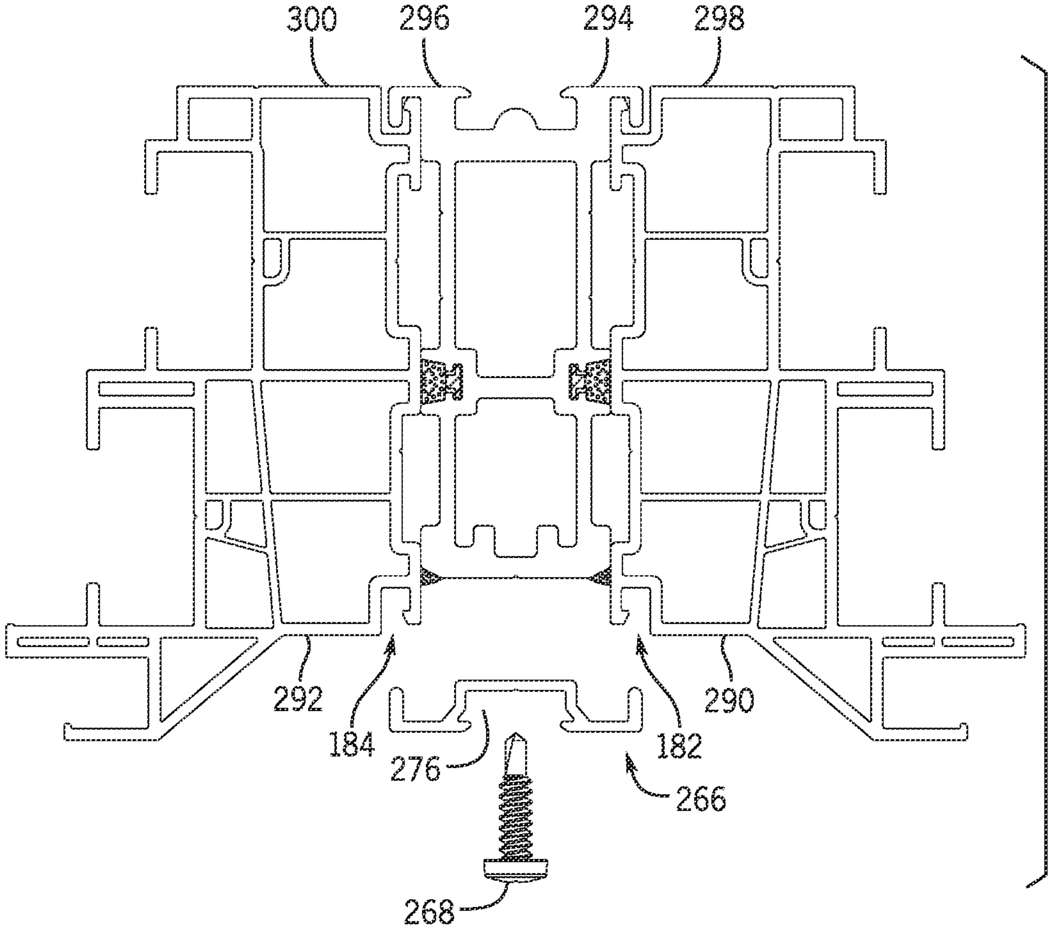
FIG. 4 is the cross sectional view of FIG. 3 with the primary mull body secured to, and secondary mull portion secured to the fenestration assembly and an interior cover and an exterior cover.
Figure 4A:
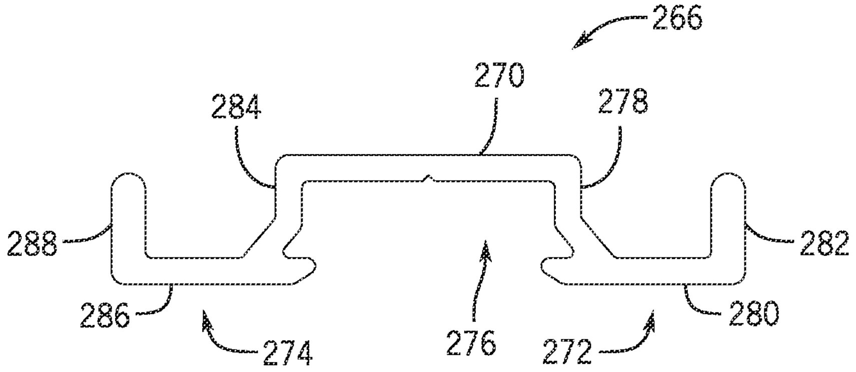
FIG. 4A is a close-up of a cross section of the secondary mull connector of FIG. 4.

Referring to FIG. 4 a secondary mull connector 266 is operatively secured to second end portion 214 of primary mull connector 210 with a fastener 268 and in one implementation secondary mull connector 266 is further secured to the first fenestration frame 102 and the second fenestration frame 104 by being fit into second side first receiving portion 182 of second jamb 110 of the first fenestration frame 102 and into second side second receiving portion 184 of first jamb 112 of the second fenestration frame 104.

Secondary mull connector 266 is provided with a center planar portion 270 that is positioned adjacent to second end portion 214 of primary mull connector 210 when the secondary mull connector 266 is secured to primary mull connector 210. Secondary mull connector is provided with a first U shaped member 272 extending away from center planar portion 270 and a second U shaped member 274 extending from center planar portion 270 and spaced from first U shaped member 272. First U shaped member 272 and second U shaped member 274 define a recess 276 in which a head of fastener 268 can reside when assembly is complete. First U shaped member 272 includes a first leg 278 extending away from center planar portion 270 in a direction away from first jamb engagement portion 216, and a second leg 280 spaded from and substantially parallel to center planar portion 270 and a third leg 282 extending from 280 in direction toward first jamb engagement portion 216. Third leg 282 has a free end that is received within second side first receiving portion 182 in a snap fit arrangement.

Similarly, second U shaped member 274 includes a first leg 284 extending away from center planar portion 270 in a direction away from second jamb engagement portion 218, and a second leg 286 spaded from and substantially parallel to center planar portion 270 and a third leg 288 extending from second leg 286 in direction toward second jamb engagement portion 218. Third leg 288 has a free end that is received within second side second receiving portion 184 in a snap fit arrangement.

In one implementation second leg 280 and second leg 286 are substantially coplanar with adjacent region 290 of second jamb 110 of first fenestration frame 102 and adjacent region 292 of first jamb 112 of second fenestration frame 104. First side of primary mull connector 210 includes a first terminal portion 294 and a second terminal portion 296 that are substantially coplanar with adjacent region 298 of second jamb 110 of first fenestration frame 102 and with adjacent region 300 of first jamb 112 of second fenestration frame 104. In this manner primary mull connector 210 and secondary mull connector 266 do not extend beyond the first side and second side of second jamb 110 and first jamb 112 when primary mull connector 210 and secondary mull connector 266 are secured thereto.

Figure 5:
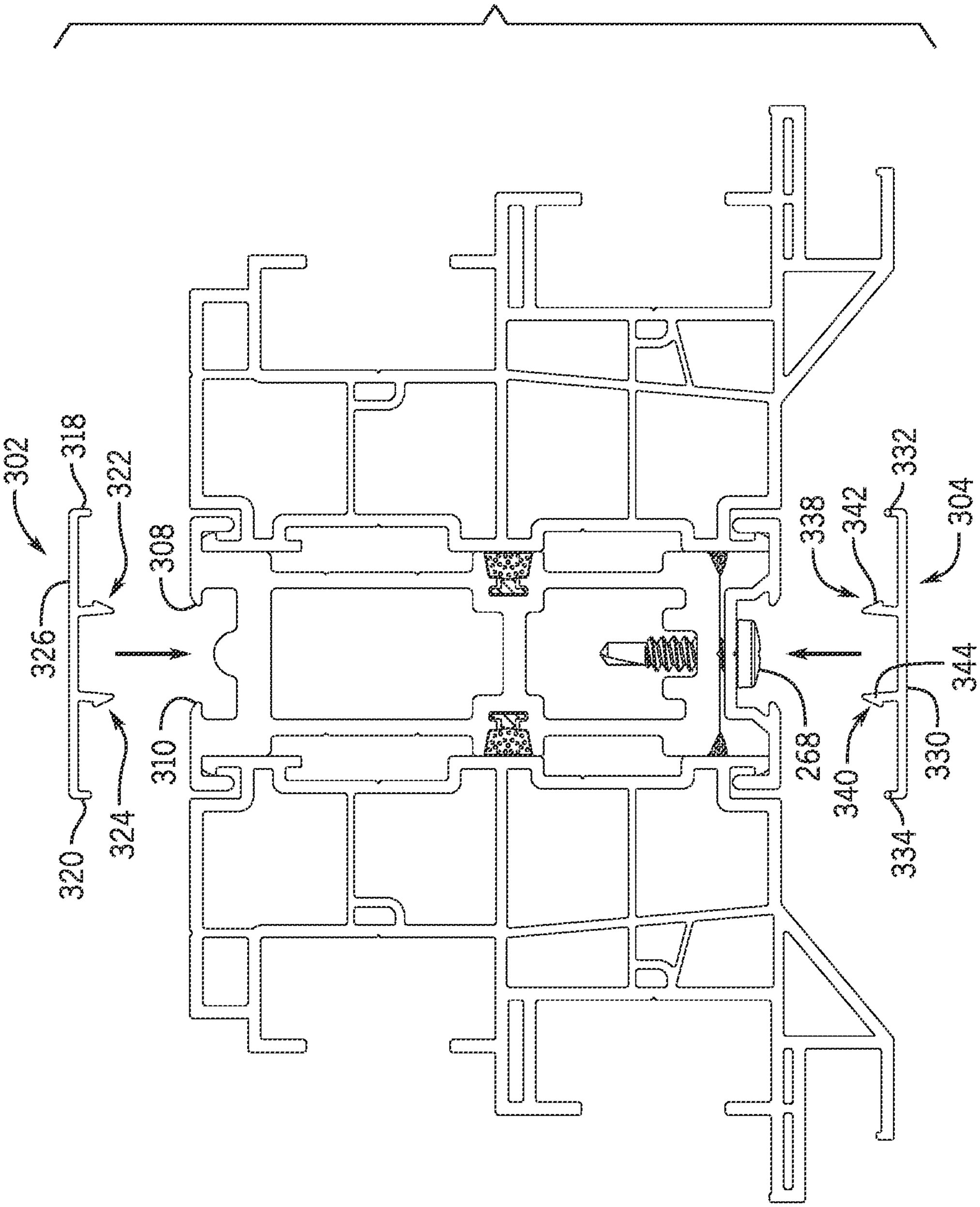
FIG. 5 is the cross sectional view of FIG. 4 in the fully installed position.

Referring to FIG. 5, the mull assembly 106 is further provided with end covers to provide the desired aesthetic result. A first side end over 302 is operatively connected to a first side of primary mull connector 210 and a second side end cover 304 is operatively connected to the secondary mull connector 266. In one implementation, first side end cover 302 is connected to primary mull connector 210 with a snap fit connection and second side end cover 304 is connected to secondary mull connector 266 with a snap fit connection. Primary mull connector 210 includes a cover receiving portion 306 having a first protrusion 308 and a second protrusion 310 extending from first wall 222 and first wall 230 respectively in a direction toward center line 252. A recess 312 is defined by first wall 222 and first recess 260 and a center portion 314 of first end of primary mull connector 210. In one implementation, first side end cover 302 includes a planar portion 316 that is visible from the first side of the mulled assembly once first side end cover 302 is secured to primary mull connector 210. One implementation first side end cover 302 further includes a pair of legs 318, 320 extending from terminal ends of 316. First side end cover 302 further includes a pair of legs 322, 324 each having a barb 326, 328 proximate a free end thereof. Pair of legs 322, 324 extending generally perpendicular to planar portion 316 and are spaced apart from one another. First side end cover 302 is secured to primary mull connector 210 by moving first side end cover 302 in a direction from the first side toward the second side, legs 322, 324 bend away from center line 252 as barbs contact first protrusion 308 and second protrusion 310 respectively, until 322, 324 clear first protrusion 308 and 310 at which point, legs 322, 324 snap back to their non stressed position. In this manner cover 302 is snap fit to primary mull connector 210. The term snap fitting as used herein refers to an assembly method used to attach flexible parts, to form the final product by pushing the parts' interlocking components together.

Figure 6:
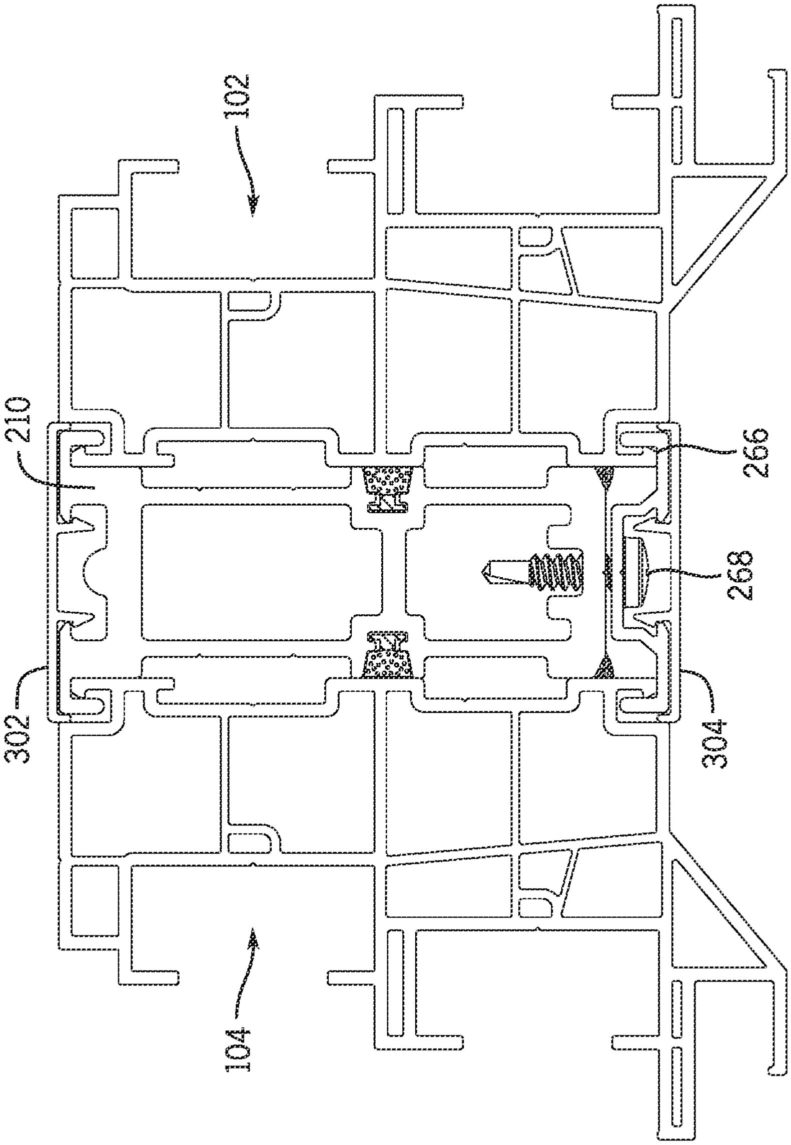
FIG. 6 is a cross sectional view of another example fenestration assembly in a fully installed position.

Referring to FIG. 6 leg 318 of first side end cover 302 fits within a gap between second wall 226 and second jamb 110 and leg 320 fits within a gap between second wall 234 and first jamb 112. In one implementation primary mull connector 210, second jamb 110 of first fenestration frame 102 and first jamb 112 of second fenestration frame 104 is designed such that exposed portion of planar portion 316 of first side end cover 302 is co-planar with adjacent region 298 and adjacent region 300 of second jamb 110 and first jamb 112.

Referring to FIG. 5 second side end cover 304 includes a planar portion 330 that is visible from the second side of the mulled assembly once second side end cover 304 is secured to secondary mull connector 266. One implementation second side end cover 304 includes a pair of legs 332, 334 extending from terminal ends of second side end cover 304. Second side end cover 304 further includes a pair of legs 338, 340 each having a barb 342, 344 proximate a free end thereof. Pair of legs 338, 340 extend generally perpendicular to planar portion 330 and are spaced apart from one another, Second side end cover 304 is secured to secondary mull connector 266 by moving second side end cover 304 in a direction from the second side toward the first side. Second pair of legs 338, 340 bend away from center line 252 as barbs 342, 344 contact a first protrusion 346 and a second protrusion 348 respectively on secondary mull connector 266, until barbs 342, 346 clear protrusion 346, 348 at which point, legs 338, 340 snap back to their non stressed position. In this manner second side end cover 304 is snap fit to secondary mull connector 266. As noted above a fastener 268 may be used to secure secondary mull connector 266 to primary mull connector 210.

Referring to FIG. 6 legs 332, 334 of second side end cover 304 fits within gaps between first wall portion 188 of second side first receiving portion 182 and first wall portion 200 of second side second receiving portion 184 respectively. In one implementation, secondary mull connector 266, second jamb 110 of first fenestration frame 102 and first jamb 112 of second fenestration frame 104 are designed such that exposed portion of planar portion 330 of second side end cover 304 is co-planar with adjacent region 290 and adjacent region 292 respectively.

In one implementation primary mull connector 210 is symmetric about center line 252 but is not symmetric about a mid-center line 350 extending perpendicular to center line 252 and mid-way between first jamb engagement portion 216 and second jamb engagement portion 218. In part primary mull connector 210 is not symmetric about 350 since a first side of primary mull connector 210 has a first jamb engagement portion 216 while a second opposite side of primary mull connector 210 is free of a jamb engagement portion.

Figure 7:
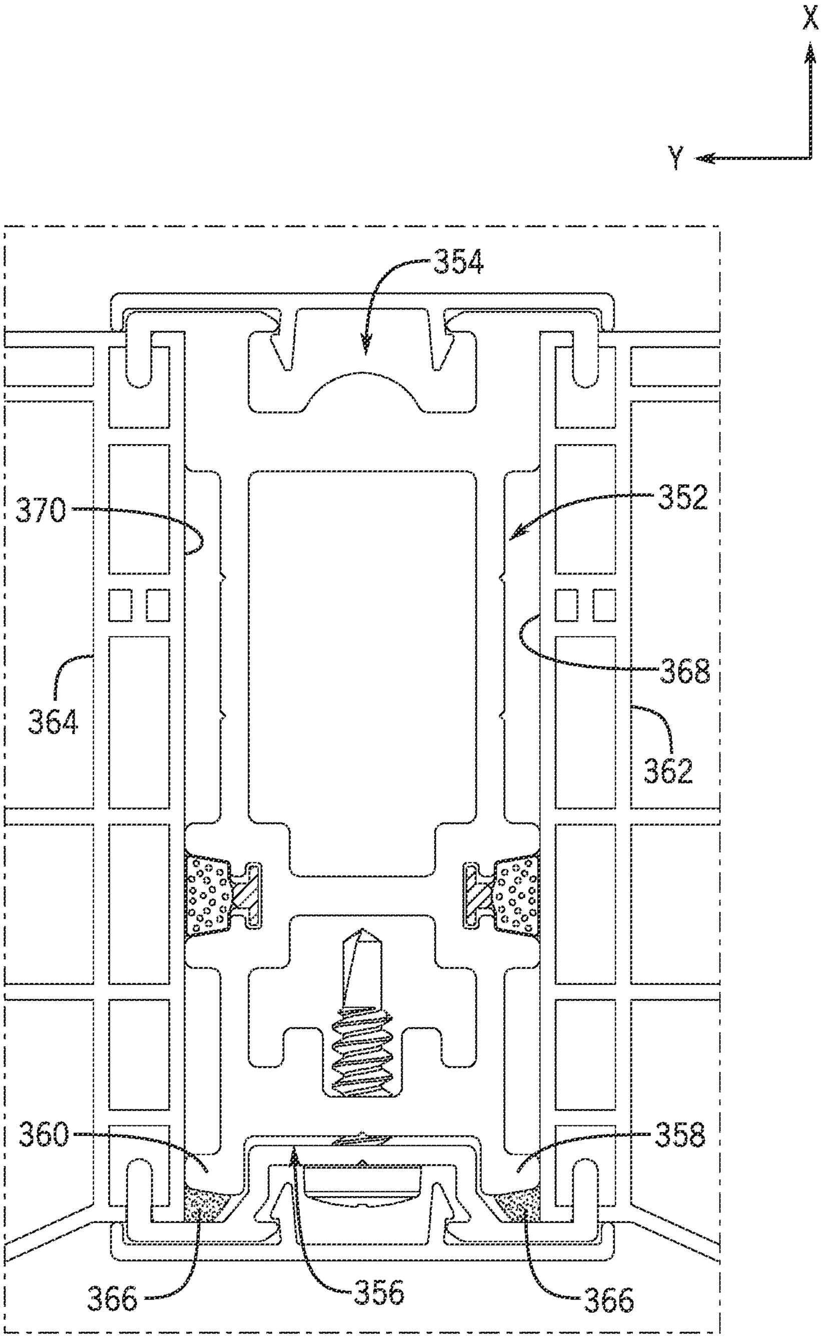
FIG. 7 is a fenestration mulled assembly.

Referring to FIG. 7 in one implementation, FIG. 7 is a cross sectional view of another example fenestration assembly in a fully installed position. The mull assembly shown in FIG. 7 is similar to the example described above with reference to FIGS. 2-6 and includes a primary-mull connector 352 with a first end 354 and a second end 356. In the example of FIG. 7, the second end 356 of the primary mull connector 352 is provided with protrusions 358, 360 adjacent to the jambs 362, 364. With the protrusions extending further toward the exterior end of the assembly, an exterior sealant 366 is also applied further toward the exterior end. The exterior sealant again provides a seal between the primary mull connector 352 and the jambs 362, 364. The secondary mull connector is again secured to the primary mull connector 352. Note that jambs 362, 364 have a different geometry than second jamb 110 and first jamb 112 described herein without recesses within facing walls 368, 370.

Figure 8:
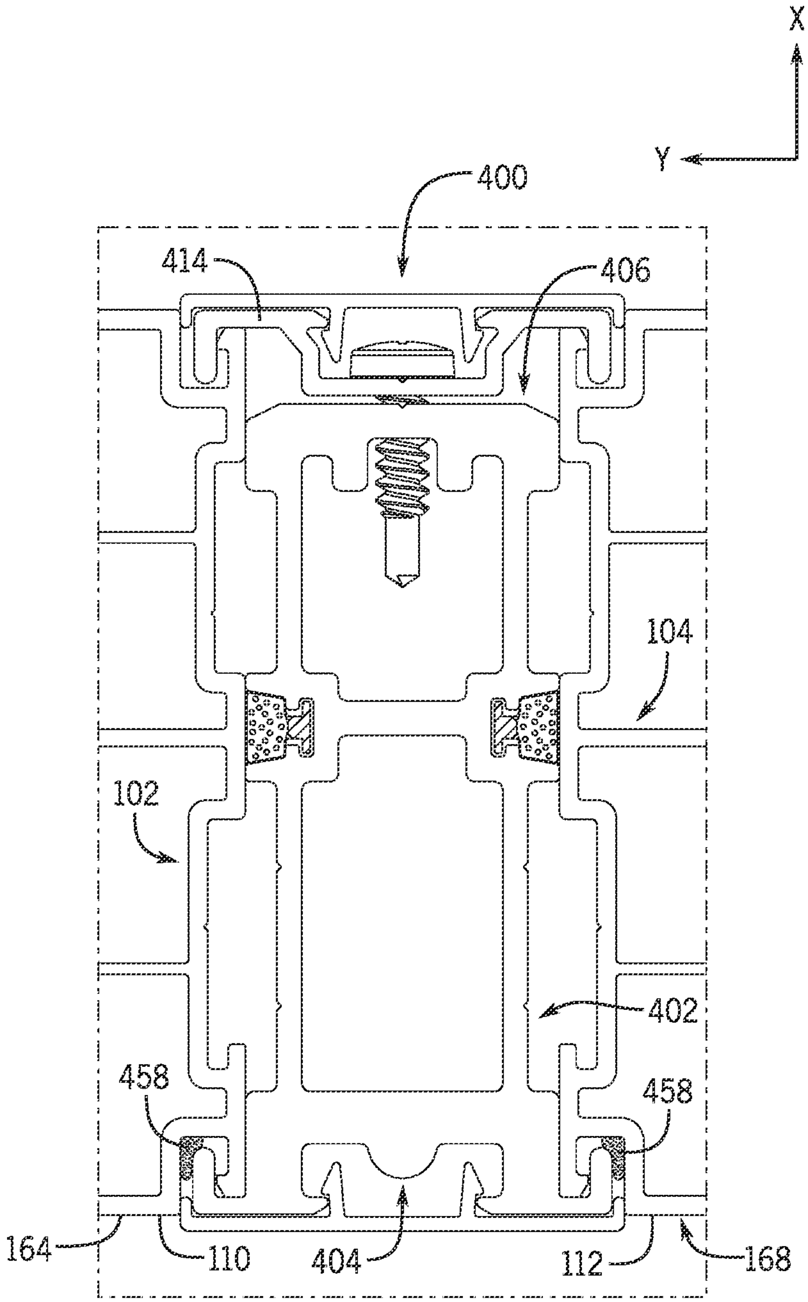
FIG. 8 is a cross sectional view of a fenestration assembly in a fully installed position when installed from exterior to interior.

As noted above, in the examples illustrated in FIGS. 2-7, the primary mull connector 210 is shown inserted from the interior of the building to the exterior of the building, FIG. 8 illustrates an assembly 400 in which the primary mull connector 402 is inserted from the exterior of a building to the interior of the building. In this regard, the first end 404 of the primary mull connector 402 is positioned on the exterior side, and the second end 406 is positioned on the interior side. The secondary mull connector 414 is secured to the second end 406 of the primary mull connector 402, Since the first end 404 of the primary mull connector 402 is on the exterior side, it may be desirable to apply an exterior sealant 458 on the first end of the primary mull connector 402. In this regard, the exterior sealant 458 may be applied prior to complete insertion of the primary mull connector 402 to allow for proper sealing between the jambs 110, 112 and the primary mull connector 402.

Referring to FIGS. 2-6 first fenestration frame 102 and second fenestration frame 104 are are mulled together by first providing placing second jamb 110 of first fenestration frame 102 spaced from and facing first jamb 112 of second fenestration frame 104. Primary mull connector 210 slid between the second jamb 110 of first fenestration frame 102 and first jamb 112 of second fenestration frame 104 in a direction from first side 116 of the first fenestration frame and first side 120 of second fenestration frame 104 toward a second side second side 118 of first fenestration frame 102 and second side 122 of second fenestration frame 104. Stated another way, where first fenestration frame 102 and second fenestration frame 104 are windows having a glazing, primary mull connector 210 is slide between first fenestration frame 102 and second fenestration frame 104 in an install direction from the inside toward the outside that is perpendicular to the glazing of the fenestration frames.

Primary mull connector 210 is slid between first fenestration frame 102 and second fenestration frame 104 until a jamb engagement portion of primary mull connector 210 engages a first portion of the second jamb of the first fenestration frame on the first side of the first fenestration frame and a first portion of the first jamb of the second fenestration frame on the first side of the second fenestration frame. In this manner first fenestration frame 102 and second fenestration frame 104 are coupled together. Primary mull connector 210 has a second end that is free of a jamb engagement portion. The jamb engagement portion of primary mull connector 210 is snap fit to first fenestration frame 102 and second fenestration frame 104 without the need for a tool. As primary mull connector 210 is slid between first fenestration frame 102 and second fenestration frame 104 second walls 226 and 234 engage groove 128 and groove 140 respectively and are frictionally engaged by barb 136 and barb 148 respectively. In one implementation second walls 226 and 234 include a protrusion (not shown) that respectively, are engaged with barb 136 and barb 148.

In one implementation prior to sliding primary mull connector 210 between first fenestration frame 102 and second fenestration frame 104 in an install direction a first weather stripping member and a second weather stripping member are secured to first groove 236 and second groove 244 respectively of primary mull connector 210.

A free portion of first weather stripping member and a free portion of second weather stripping member are compressed as primary mull connector 210 is slid between first fenestration frame 102 and 104 thereby providing a weather stripping seal between a body of primary mull connector 210 and second jamb 110 of first fenestration frame 102 and first jamb 112 of second fenestration frame 104.

Referring to FIG. 4 secondary mull connector 266 is slid toward primary mull connector 210 between first fenestration frame 102 and second fenestration frame 104 in a direction opposite of the primary mull connector 210 install direction. A fastener 268 such as a screw connects fastener 268 to the second end of primary mull connector 210.

In one implementation as fastener 268 is moved toward primary mull connector 210 in the direction opposite the install direction of primary mull connector 210 first jamb engagement portion 216 and second jamb engagement portion 218 are snap fit into the second jamb 110 of the first fenestration frame 102 on the second side of the first fenestration frame 102 and the first jamb 112 of the second fenestration frame 104 on the second side of the second fenestration frame 104.

In one implementation, a sealant such as known in the art is applied to the end of primary mull connector 210 that is adjacent second jamb 110 of first fenestration frame 102 and first jamb 112 of second fenestration frame 104.

A first end cover is snap 302 fit onto primary mull connector 210 and a second end cover 304 is snap fit onto secondary mull connector 266 to provide an aesthetic appearance. In one implementation a pair of members 322, 324 having opposingly facing barbs at terminal ends thereof are snap fit into a cover receiving portion of primary mull connector 210. Terminal free ends of members 318, 320 of first end cover extend into slots defined by the space between primary mull connector 210 and first fenestration frame 102 and second fenestration frame 104 adjacent to the first end of primary mull connector 210. A second end cover 304 is snap fit onto secondary mull connector 266 as discussed herein above.

It is important to note that the construction and arrangement of system for mulling a plurality of fenestration assemblies as described herein is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements and vice versa, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A system for mulling a first fenestration frame and a second fenestration frame together, the system comprising:

a first fenestration frame having a first jamb and a second jamb;

a second fenestration frame having a having a first jamb and a second jamb;

a primary mull connector being formed as a unitary one piece member slidingly received between the first fenestration frame and the second fenestration frame in a direction from a first side of the first fenestration frame and the second fenestration frame toward a second side of the first fenestration frame and the second fenestration frame, the primary mull connector having a sole jamb connector portion on a first end of the primary mull connector, the sole jamb connector portion fitting into a first portion of the second jamb of the first fenestration frame on the first side of the first fenestration frame and a first portion of the first jamb of the second fenestration frame on the first side of the second fenestration frame, wherein the primary mull connector has a second end with a bottommost surface having no jamb engagement portion configured to prevent movement of the first side of the second jamb of the first fenestration frame in a perpendicular direction away from the first side of the first jamb of the second fenestration frame, the primary mull connector extending substantially an entire distance between the first side and the second side of the first fenestration frame and the second fenestration frame, the primary mull connector being free of any jamb connector portions between the first end of the primary mull connector and the second end of the primary mull connector; and a secondary mull connector secured to the second end of the primary mull connector with a screw and being fit into the second jamb of the first fenestration frame on the second side of the first fenestration frame and the first jamb of the second fenestration frame on the second side of the second fenestration frame, preventing movement of the second end of the second jamb of the first fenestration frame in a perpendicular direction away from the second side of the second jamb of the first fenestration frame, wherein the primary mull connector is secured to the first fenestration frame and the second fenestration frame free of any fasteners extending through the primary mull connector and the first fenestration frame and the second fenestration frame, wherein the second jamb of the first fenestration frame faces the first jamb of the second fenestration frame, the primary mull connector including a first groove and a second groove intermediate the first end of the primary mull connector and the second end of the primary mull connector, a first weather stripping having a first side within the first groove and a second weather stripping having a first side with the second groove, wherein the first weather stripping is compressed by a first flat raised portion of the first fenestration frame, and wherein the second weather strip is compressed by a second flat raised portion of the second fenestration frame.

2. The system of claim 1, further including first end cover configured to fit onto the first end of the primary mull connector.

3. The system of claim 1, further including a second end cover configured to fit onto the secondary mull connector.

4. The system of claim 1, wherein the secondary mull connector includes a planar portion positioned adjacent to a planar portion of the second end of the primary mull connector and raised portions extending away from the second end of the primary mull connector.

5. The system of claim 1, wherein a first weather stripping coupled to the primary mull connector includes a first sealing portion contacting the second jamb of the first fenestration frame and a second weather stripping coupled to the primary mull connector includes a second sealing portion contacting the first jamb of the second fenestration frame.

6. The system of claim 5, wherein the second jamb of the first fenestration frame includes a first raised portion intermediate the first side of the first fenestration frame and the second side of the first fenestration frame, and wherein the first jamb of the second fenestration frame includes a second raised portion intermediate the first side of the second fenestration frame and the second side of the second fenestration frame; wherein the first sealing portion of the first weather stripping contacts the first raised portion of the second jamb of the first fenestration frame and the second sealing portion of the second weather stripping contacts the second raised portion of the first jamb of the second fenestration frame.

7. The system of claim 6, wherein the second end of the primary mull connector has a planar surface with protrusions adjacent to the second jamb of the first fenestration frame and to the first jamb of the second fenestration frame.

8. The system of claim 1, wherein the second end of the primary mull connector is planar.

9. The system of claim 1, wherein the second jamb of the first fenestration frame and the first jamb of the second fenestration frame includes substantially planer surfaces facing each other.

10. The system of claim 1, further including a sealant sealing an exterior portion of the primary mull connector with second jamb of the first fenestration frame and with the first jamb of the second fenestration frame.

11. The system of claim 1, wherein the jamb connector portion includes a first member received with in a first groove in the second jamb of the first fenestration frame and a second member received within a second groove in the first jamb of the second fenestration frame, a cover operatively connected to the first end of the primary mull connector includes a first leg being positioned in the first groove and a second leg being positioned with in the second groove in the first jamb of the second fenestration frame.

12. A method for mulling a plurality of fenestration frames, the method comprising:

providing a first fenestration frame and a second fenestration frame, each of the first fenestration frame and the second fenestration frame having a respective first jamb and a second jamb, the second jamb of the first fenestration frame facing the first jamb of the second fenestration frame;

sliding a unitary one piece primary mull connector between the second jamb of the first fenestration frame and the first jamb of the second fenestration frame in a direction from a first side of the first fenestration frame and the second fenestration frame toward a second side of the first fenestration frame and the second fenestration frame, the primary mull connector having a sole jamb connector portion fitting into a first portion of the second jamb of the first fenestration frame on the first side of the first fenestration frame and a first portion of the first jamb of the second fenestration frame on the first side of the second fenestration frame, wherein the primary mull connector has a first end with the jamb connector portion and a second end having a bottommost portion with no jamb connector portion, the primary mull connector being free of any jamb connector portions between the first end of the primary mull connector and the second end of the primary mull connector;

wherein prior to sliding the primary mull connector between the first fenestration assembly frame and the second fenestration frame, the second jamb of the first fenestration frame and the first jamb of the second fenestration frame are separated by a first minimum distance that is less than a second distance defined as a maximum width of the sole jamb connector portion, providing a first weather stripping coupled to the primary mull connector and including a sealing portion; and providing a second weather stripping coupled to the primary mull connector and including a sealing portion, wherein, when the primary mull connector is slid between the second jamb of the first fenestration frame and the first jamb of the second fenestration frame, the sealing portion of the first weather stripping contacts the second jamb of the first fenestration frame and the sealing portion of the second weather stripping contacts the first jamb of the second fenestration frame, wherein the first weather stripping is compressed by a first flat raised portion of the first fenestration frame, and wherein the second weather strip is compressed by a second flat raised portion of the second fenestration frame.

13. The method of claim 12, further comprising fitting a first end cover onto the first end of the primary mull connector.

14. The method of claim 12, further comprising:

securing a secondary mull connector to the second end of the primary mull connector and being fit into the second jamb of the first fenestration frame on the second side of the first fenestration frame and the first jamb of the second fenestration frame on the second side of the second fenestration frame.

15. The method of claim 14, wherein the secondary mull connector is secured to the primary mull connector with a fastener extending through the secondary mull connector and the second end of the primary mull connector, wherein a portion of the secondary mull connector is adjacent the second end of the primary mull connector and free of any material therebetween.

16. The method of claim 14, wherein the secondary mull connector is snap fitted to the second jamb of the first fenestration frame and the first jamb of the second fenestration frame.

17. The method of claim 14, further comprising fitting a second end cover onto the secondary mull connector.

18. The method of claim 12, further comprising:

applying a sealant sealing an exterior portion of the primary mull connector with second jamb of the first fenestration frame and with the first jamb of the second fenestration frame.

* * * * *